(No Model.) 3 Sheets—Sheet 1.

C. J. KINTNER.
ELECTRIC MOTOR.

No. 452,795. Patented May 26, 1891.

Witnesses
Geo. W. Breck
Henry W. Lloyd

Inventor
Charles J. Kintner

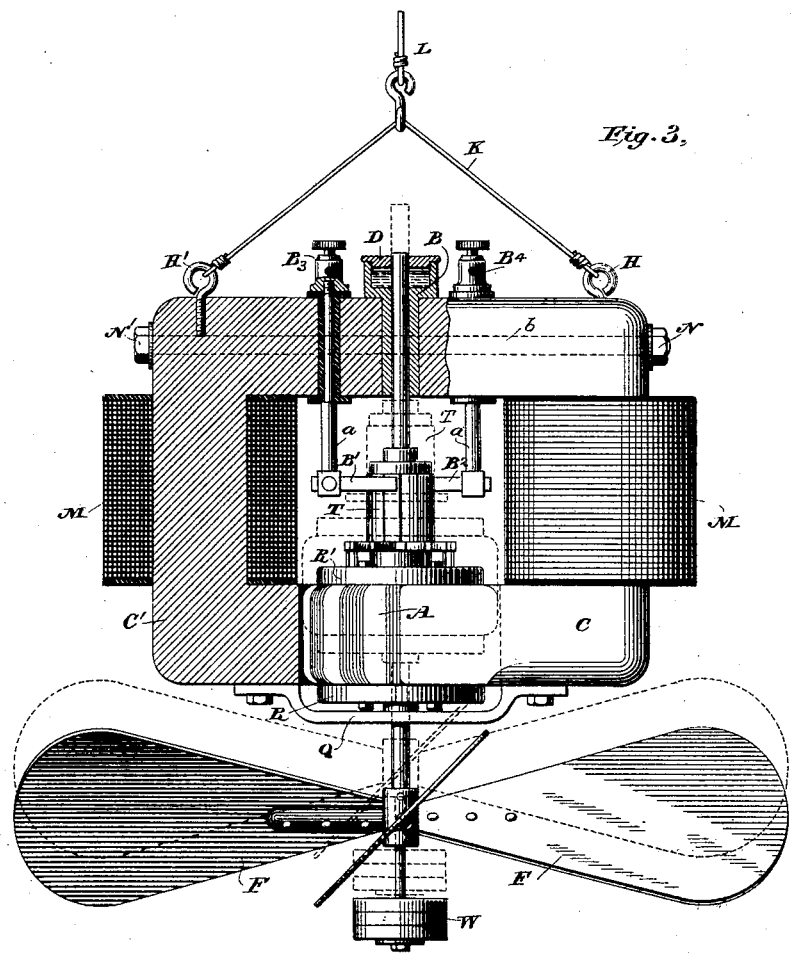

(No Model.)  3 Sheets—Sheet 3.
C. J. KINTNER.
ELECTRIC MOTOR.
No. 452,795.  Patented May 26, 1891.
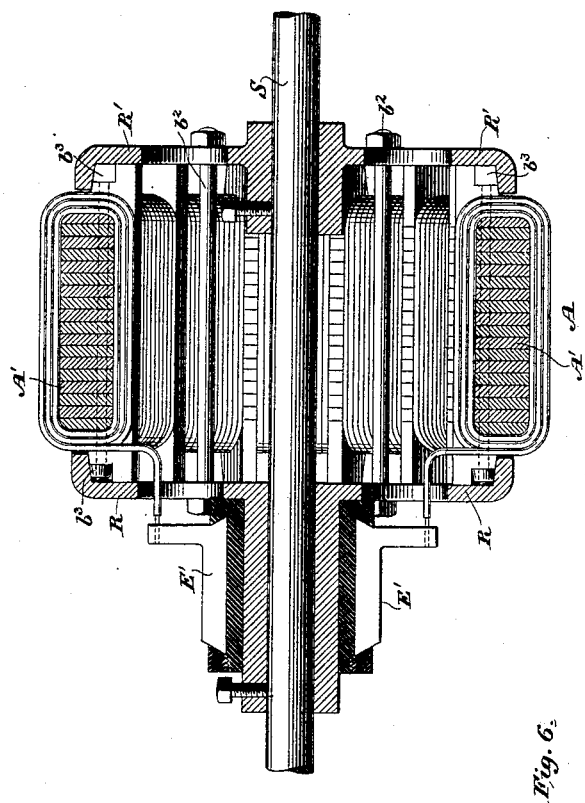
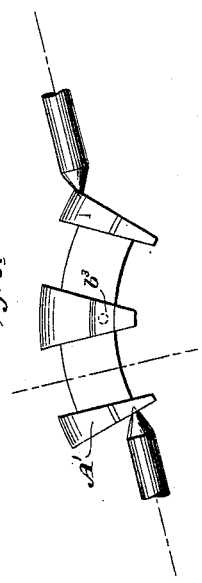
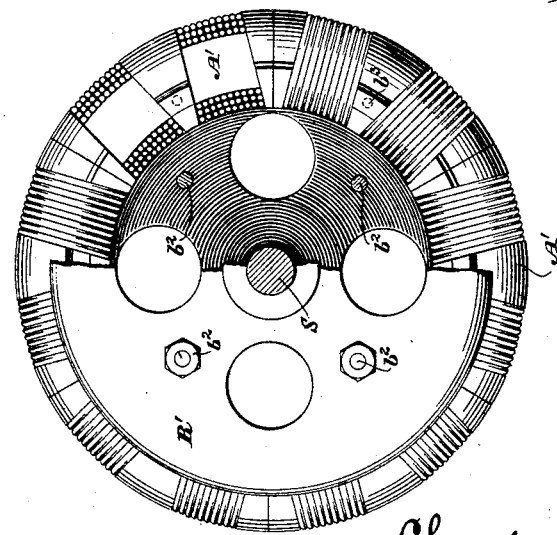
Witnesses
Geo. W. Breck.
Henry W. Lloyd.
Inventor
Charles J. Kintner

UNITED STATES PATENT OFFICE.

CHARLES J. KINTNER, OF NEW YORK, N. Y.

ELECTRIC MOTOR.

SPECIFICATION forming part of Letters Patent No. 452,795, dated May 26, 1891.

Application filed June 14, 1890. Serial No. 355,412. (No model.)

*To all whom it may concern:*

Be it known that I, CHARLES J. KINTNER, a citizen of the United States, residing at New York, county of New York, and State of New York, have made a new and useful invention in Electric Motors, of which the following is a specification.

My invention has for its objects, first, to simplify and cheapen this type of motor; second, to afford a simple and efficient means of self-regulation for electric motors; third, the accomplishment of the several features hereinafter indicated, all of which objects are attained in the practice of the methods and by the use of the apparatus hereinafter described, but particularly pointed out in the claims which follow this specification.

It is a well-known fact that with many existing types of dynamo-machines and electric motors which are exceedingly efficient much difficulty is experienced in the building thereof, owing to the inconvenience found in winding the field-cores and armature-bobbins. It is also a fact that the well-known form of Gramme armature is one of the most efficient armatures for electric motors that is found in the market; but the difficulty experienced in winding such an armature, as just indicated, makes it a serious item of expense in the building of this type of machine. It is also a well-known fact that where many electric motors are operated in series from a single source of electrical supply, as on an arc-light circuit, there is absolute necessity for self-regulation in each independent motor, and many devices have been designed for effecting this regulation.

My improved electrical motor is designed especially for use with revolving fans, such as are now largely in public use throughout the United States, and, although it has an especial use in this particular, I do not limit myself to this application, as it is obvious that many of the details of construction hereinafter described and claimed are applicable to various forms of electric motors adapted to various uses.

My invention will be fully understood by referring to the accompanying drawings, in which—

Figure 1:
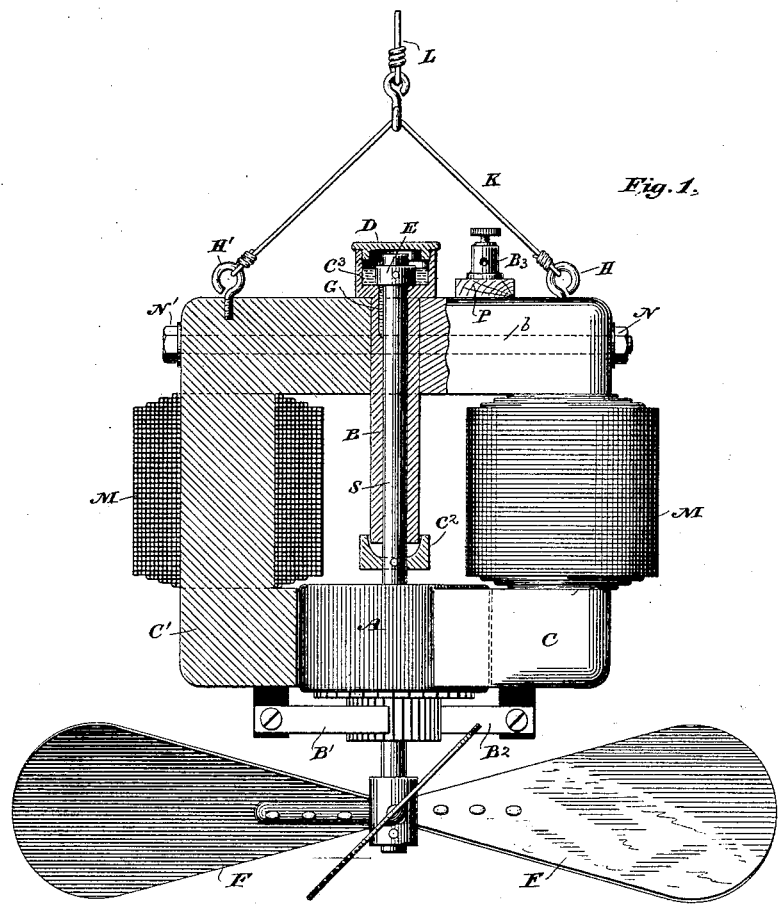
Figure 2:
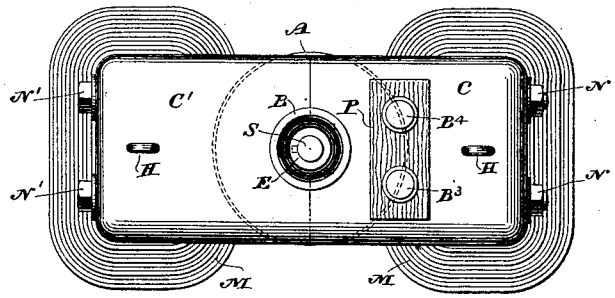

Figure 1 is a side elevational view, partly in section, showing one form of my improved electric motor with a fan attachment. Fig. 2 is a plan view of Fig. 1 as seen looking from the top of the motor downward, the fan having been removed. Fig. 3 is a side elevational view, partly in section, of a modified form of my improved electric motor with a fan attachment. Fig. 4 is a side elevational view of the armature used in my improved motor. Fig. 5 is a longitudinal sectional view of said armature. Fig. 6 is a detail view of a sectional part of the armature-core shown in position for winding the bobbins in a lathe.

Referring now to the drawings in detail, in all of which like letters of reference represent like parts wherever used, M M are the field-magnets wound upon the field-cores C C'. These field-cores C C' are made in two parts, and if of solid metal are preferably drop-forged and independently wound upon a lathe, after which they are joined together at the center of their supporting-yoke or neutral point by bolts $b$, having heads and nuts N N', said bolts extending entirely through the yoke, as clearly shown in Fig. 1.

A is the armature, preferably of the Gramme type, supported by a shaft S, which carries a fan F at its lower end, the blades of which may be adjusted at various angles by any well-known means, said shaft S having a journal-bearing provided with a collar E at its upper end, which rests normally on the upper end of a long journal-bearing B, securely held in place between the two field-magnet cores C C', the upper end of said journal-bearing constituting an oil-box $C^3$, provided with an oil-groove G and a removable cap D for retaining the oil. An additional oil-cup $C^2$ is provided for catching the drip.

B' $B^2$ are the commutator-brushes, and H H' are screw-eyes secured in the upper ends of the field-magnet cores C C' and adapted to receive a sustaining wire or cord K, which in turn is secured to a vertical cord or wire L by a hook, as shown.

$B^3$ $B^4$ are the binding-posts, to which the incoming and outgoing conductors are secured and from which the current passes to the machine through the field-magnets, the commutator-brushes, and armature to the outer circuit, either in series or in shunt, in a manner well understood by all electricians.

I will now describe the construction of the armature. (Clearly shown in Figs. 4, 5, and 6.) Its core A' is made up of a series of core-pieces, either solid or laminated, and having the form shown in Fig. 6. If laminated, the laminated portions should be held together by bolts $b^3$, and the ends of the laminations of each separate section should lap over those of the succeeding sections on either side when they are placed together end to end, as in Fig. 4. There is an even number of these sections, and two bobbins are wound on each section in a lathe in a manner well understood by those skilled in the art, after which the several sections are grouped together and held in place by two brass or other equivalent non-magnetic collars R R', the inner edges of which are beveled and adapted to draw the several sections of the core into closer connection with each other, and thereby bringing them firmly together. This is accomplished either by bolts $b^2$, extending entirely through the interior of the armature, or either one or both the collars R R' may be screw-threaded on the axle, the commutators E' E' being secured to the collar R by a detachable screw-threaded ring in a manner well known. It will be seen that the collars R R' are provided with large openings for permitting of complete ventilation, as well as to afford access for the several outgoing connections between the bobbin-windings and the commutator-strips.

The form of motor shown in Fig. 1 is not self-regulating; but there is a slight vertical play allowed to the armature A and its shaft S, whereby the oil-duct G may be allowed to fill at each time before starting, thereby preventing an unnecessary waste of oil and affording a neat and simple means of continuous oiling.

I prefer to make the armature A and its attached portions of such weight that when the fan F is running at normal speed it will just balance or sustain said weight, thereby removing as far as possible the element of friction due to the weight of said parts, the only friction then existing being found between the commutator-brushes and their bearing, with the addition of the slight tangential bearing to be found in the long journal B. With such an arrangement, therefore, I am enabled to obtain the best results with the least expenditure of energy, which energy is expended in well-known forms of electric motors in overcoming the friction due to the weight of the armature and its attached parts on the journal-bearings. By my arrangement of these parts, as herein disclosed, I am enabled to cause the armature to expend almost the entire energy imparted to it in driving the fan, thereby largely increasing the efficiency of the machine.

The preferred form of my improved electric motor is shown in Fig. 3, in which the weight of the armature A and its connections is sustained by a non-magnetic yoke Q, joining the lower ends of the field-cores C C', while the upper end of the armature-shaft is journaled in a long journal-bearing, as before, provided with an oil-cup, through which it extends at its top.

The commutator-brushes B' B² are sustained by two arms $a$, secured in insulating-bearings in the upper portions of the field-cores and provided with binding-posts B³ B⁴.

A fan F is secured to the lower end of the shaft S, as before, and adjustable or detachable weights W are affixed thereto, as shown.

The commutator-strips E', upon which the brushes B' B² rest, are of much greater length than are those shown in Fig. 1, and the brushes B' B² bear on their extreme upper ends when the motor is quiescent or running at the desired speed.

The entire armature A and all of the parts carried by the armature-shaft are capable of vertical movement to such an extent as to lift a greater portion of said armature out of the effective field-magnet circuit, as shown in dotted lines, and this is accomplished when the motor is running by causing the fan F, and hence the armature A, to rotate in such a direction as to give to said fan an elevating tendency as it rotates through the air. When, therefore, the motor attains an abnormal speed, the tendency is to lift the armature into the position shown in dotted lines, and hence to diminish the magnetic effect of the field, thereby decreasing the speed of the machine.

It will be readily understood that by regulating the weights W a speed may be given the armature A which will remain practically constant, dependent upon the condition of the external circuit.

I am aware that it is not new with me to withdraw the armature of an electric motor from the effective field of its field-magnets, and I make no claim to this feature, broadly.

I am also aware that electric motors have been regulated by causing extraneous mechanism to bring about this withdrawal of the armature, and that a dummy armature has been utilized in connection with the effective armature for accomplishing such regulation; but I believe it is broadly new with me to cause an electric motor to automatically lift the armature out of the effective field-magnet circuit by the direct action of a rotary fan connected to the armature-shaft.

I do not limit myself to the vertical location of the armature-shaft, as it is obvious that it may assume any angle relative to a horizontal line so long as the force of gravity tends to hold the same and its attached parts on its lower journal-bearing.

I am also aware that an electric motor has heretofore been devised with two field-magnets hinged at their upper ends to a common field-yoke, which yoke in turn sustains the armature in a plane at right angles to the length of the field-magnet cores, and I make no claim broad enough to include such structure.

I make no claim in the present application to either the method of regulation or to the method of overcoming friction between the rotary and fixed parts of an electric motor in accordance with the principles enumerated, as these features are fully claimed in a divisional application filed by me in the United States Patent Office on the 1st day of October, 1890, bearing Serial No. 366,725.

Having thus described my invention, what I claim, and desire to secure by Letters Patent of the United States, is—

1. An electric motor having a field-magnet core divided at its neutral point, in combination with an armature carried by a shaft having longitudinal movement in its journal-bearings, and a fan attached to one end of the armature-shaft, substantially as described.

2. An electric motor having a vertically-arranged armature-shaft carrying the armature normally in the magnetic field of the field-magnets when in operation, in combination with a fan adapted to lift the armature against the force of gravity, substantially as described.

3. An electric motor having a vertically-arranged armature-shaft supported normally on its lower journal-bearing, said armature-shaft having vertical movement through both journal-bearings and connected mechanically at one end to a fan which tends to lift the moving parts when the motor is in operation, substantially as described.

4. An electric motor having its armature-shaft located in a vertical or inclined position, in combination with an oil-box having an oil-retaining groove at its upper end, and a journal-bearing provided with a collar which sustains the armature when the motor is out of circuit and at the same time cuts off the oil-supply, substantially as described.

5. An electric motor having its armature sustained vertically between the field-magnets, in combination with a fan carried by the armature-shaft, the armature having vertical play sufficient to allow the fan to lift it out of the effective magnetic field, substantially as described.

6. An electric motor having its armature-shaft vertically suspended and carrying a fan on one end, in combination with means for adjustably varying the weight of the rotary part, the armature having vertical play sufficient to allow it to be raised out of the effective field of the field-magnet, substantially as described.

7. An electric motor having an armature-shaft carrying a fan at one end thereof, the armature and its shaft being sustained in substantially a vertical position and having a vertical movement sufficient to allow it and its attached parts to be carried wholly by the fan when running at normal speed without end frictional bearing, substantially as described.

8. An armature for a dynamo-electric machine or motor, having its core made up of sections bearing against each other endwise, said sections having lateral or side lugs, in combination with a pair of retaining-disks with beveled interior edges which bear upon the side lugs, substantially as described.

9. An armature for a dynamo-electric machine, having sectional core-pieces with end-to-end bearings and beveled side lugs, in combination with a pair of retaining-disks having beveled interior retaining-edges and means for uniting the disks to the sectional core-pieces, and the armature-shaft, substantially as described.

CHARLES J. KINTNER.

Witnesses:
GEO. H. STAYNER, Jr.,
A. V. HINEY.